US008079281B2

(12) United States Patent  
Taylor et al.

(10) Patent No.: US 8,079,281 B2  
(45) Date of Patent: Dec. 20, 2011

(54) ACTIVE STICK APPARATUS

(75) Inventors: Adam Taylor, Hamstreet (GB); Daniel John Wells, Erith (GB); Martyn Ingleton, Sheerness (GB)

(73) Assignee: BAE Systems plc, London (GB)

( * ) Notice: Subject to any disclaimer, the term of this patent is extended or adjusted under 35 U.S.C. 154(b) by 705 days.

(21) Appl. No.: 11/885,003

(22) PCT Filed: May 11, 2007

(86) PCT No.: PCT/GB2007/050256  
§ 371 (c)(1),  
(2), (4) Date: Aug. 23, 2007

(87) PCT Pub. No.: WO2007/132267  
PCT Pub. Date: Nov. 22, 2007

(65) Prior Publication Data  
US 2009/0229396 A1    Sep. 17, 2009

(30) Foreign Application Priority Data

May 12, 2006  (EP) ..................................... 06270048  
May 12, 2006  (GB) ................................... 0609399.1

(51) Int. Cl.  
*G05G 9/47* (2006.01)
(52) U.S. Cl. ................................................. 74/471 XY
(58) Field of Classification Search ................. 74/473.3, 74/471 XY, 473.33, 469  
See application file for complete search history.

(56) References Cited

U.S. PATENT DOCUMENTS

| 4,077,275 A | * | 3/1978 | Kluge et al. ................. 74/473.3 |
| 4,531,080 A | | 7/1985 | Nordstrom et al. |
| 5,577,417 A | | 11/1996 | Fournier |

(Continued)

FOREIGN PATENT DOCUMENTS

EP    0 352 417    1/1990

(Continued)

OTHER PUBLICATIONS

Extended European Search Report dated Jan. 13, 2011.

*Primary Examiner* — Vicky Johnson  
(74) *Attorney, Agent, or Firm* — Scully, Scott, Murphy & Presser, P.C.

(57) ABSTRACT

An active stick apparatus 40 includes a stick housing 41 and a stick control member 42 pivotally mounted to the stick housing 41 at a pivot point 43. The pivot point 43 acts to divide the stick control member 42 into a first member section 44 and a second member section 45. The pivot point 43 allows the stick control member 42 to pivot with respect to the stick housing 41, as indicated by directional arrows 46 and 47.

An actuator 50 is attached to the first member section 44 at an end distal from the pivot point 43. The actuator 50 is arranged to act as a counterbalance to movement of the stick control member 42 about the pivot point 43 under acceleration forces asserted on the stick control member 42.

The output axle drive 52 of the actuator 50 is fixedly coupled to a first section 53 of a drive link 54 and a second section 55 of the drive link 54 is pivotally coupled to a first section 56 of a mounting linkage 57. A second section 58 of the mounting linkage 57 is pivotally coupled to the stick housing 41.

Coupling of the actuator 50 to the first member section mitigates the requirement for a conventional lump mass.

22 Claims, 7 Drawing Sheets

U.S. PATENT DOCUMENTS

| | | | |
|---|---|---|---|
| 5,589,854 A * | 12/1996 | Tsai | 345/161 |
| 6,004,134 A | 12/1999 | Marcus et al. | |
| 6,186,265 B1 | 2/2001 | Boehringer et al. | |
| 6,966,397 B2 * | 11/2005 | Yanaka | 180/315 |
| 2005/0252329 A1 | 11/2005 | Demers | |

FOREIGN PATENT DOCUMENTS

| | | |
|---|---|---|
| EP | 1 220 073 | 7/2002 |
| JP | 08-057783 | 3/1996 |
| WO | WO 88/09290 | 12/1988 |

\* cited by examiner

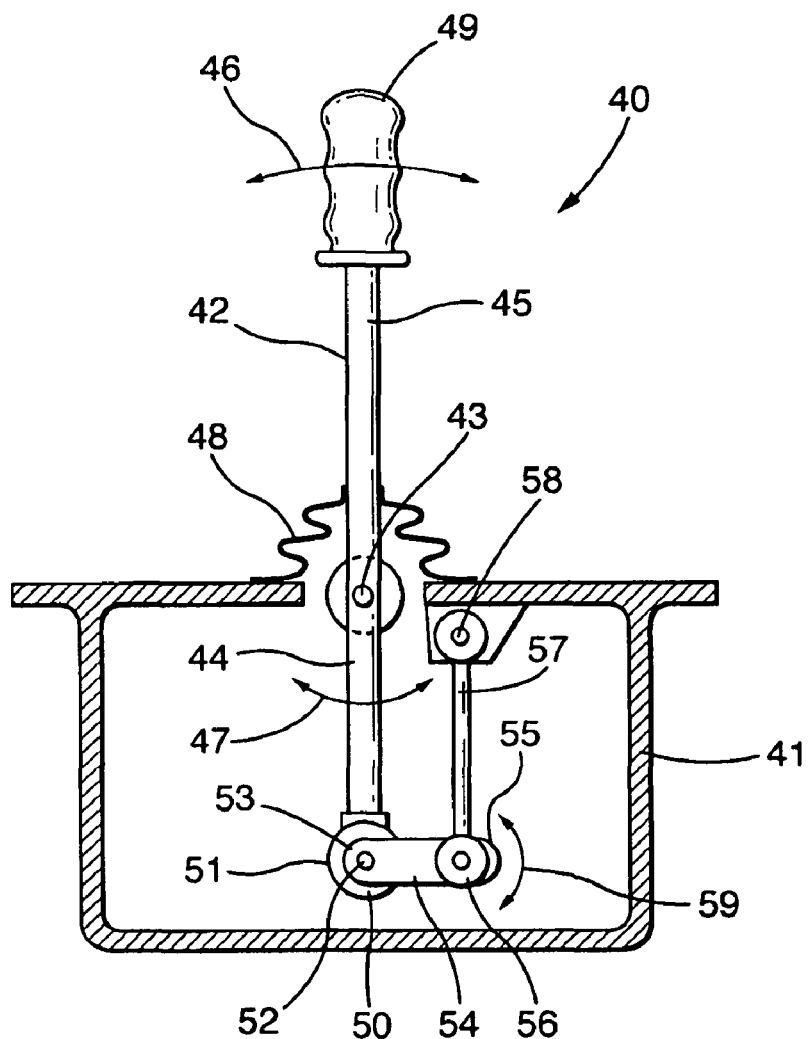

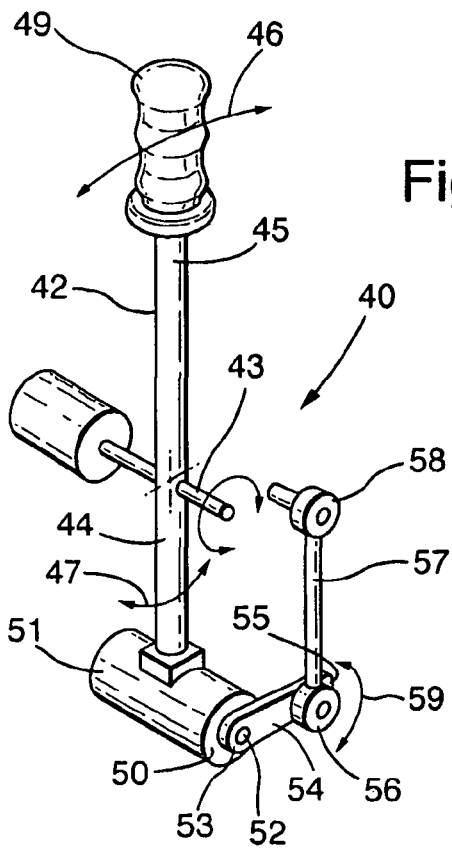
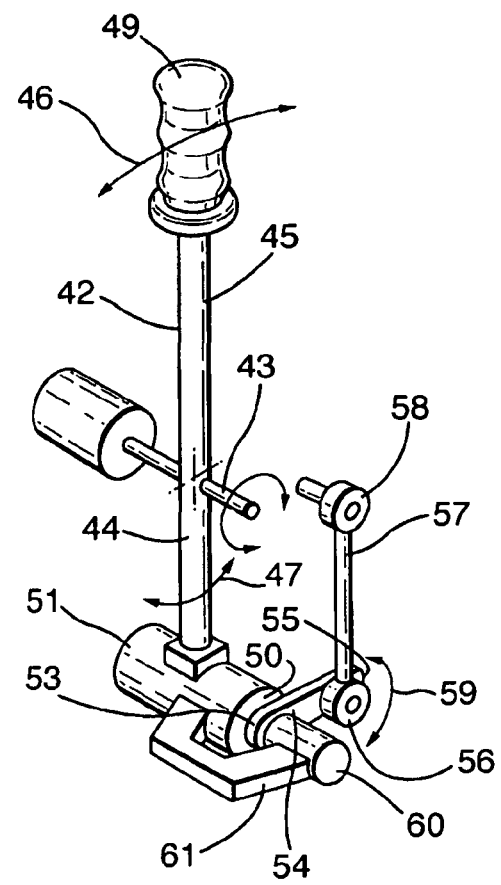

ACTIVE STICK APPARATUS

This invention relates to an active stick apparatus which is particularly, but not exclusively, suitable for use in an environment wherein the active stick apparatus is subjected to acceleration forces.

An example of such an environment could be an aircraft in flight carrying an active stick apparatus, the aircraft being subjected to buffeting and changes in direction that result in acceleration forces that act on the active stick apparatus. A further example of such an environment could be a land vehicle carrying an active stick apparatus, which is travelling over an undulating surface, the changes in direction as the vehicle traverses the undulating terrain resulting in acceleration forces acting on the active stick apparatus.

Traditionally, both passive and active stick apparatus that are to be used in a dynamic environment, i.e. wherein a vehicle carrying the active or passive stick apparatus is subjected to acceleration forces, can be mass balanced to ensure that a stick control portion of either the passive or active stick apparatus is not inadvertently moved by an inertial reaction of a control mechanism for the stick control portion to acceleration forces. A typical conventional layout of a mass balanced active stick apparatus is shown in FIGS. 1 and 2.

With reference to FIG. 1, an active stick apparatus 10 comprises a stick housing 11 and a stick control member 12, which are arranged such that the stick control member 12 is pivotally mounted to the stick housing 11 at pivot point 13. The pivot point 13 acts to divide the stick control member 12 into a first member section 14, contained within the stick housing 11, and a second member section 15, external to the stick housing 11. Normally, the stick housing 11 is fixed to a vehicle carrying the active stick apparatus 10. The pivot point 13 allows the stick control member 12 to pivot with respect to the stick housing 11, as indicated by directional arrows 16 and 17. A gaiter 18 can be provided between the second member section 15 and stick housing 11 to inhibit ingress of unwanted foreign material into the stick housing 11.

At the one end of the second member section 15, distal from the pivot point 13, there is provided a grip 19 suitable for engagement by an operator of the active stick apparatus 10, so that the operator can move the stick control member 12 in either direction shown by directional arrow 16.

Furthermore, a lump mass 20 is attached to the first member section 14 at an end distal from the pivot point 13. The lump mass 20 is arranged to act as a counter balance to movement of the stick control member 12 about pivot point 13 under external acceleration forces exerted on the stick control member 12 and associated grip 19.

Also attached to the first member section 14, between the lump mass 20 and the pivot point 13, is a first link 21. A first end 22 of the first link 21 is pivotally coupled to the first member section 14 and a second end 23 is pivotally coupled to a second link 24. The second link 24 being pivotally attached to the first link 21 at a first end 25 and a second end 26 of the second link 24 is fixedly attached to an output drive axle 27 of a servo motor 28. The servo motor 28 further comprises a housing 29 which is fixedly attached to the stick housing 11.

FIG. 2, is a schematic illustration of the active stick apparatus 10, as illustrated in FIG. 1, excluding the stick housing 11, gaiter 18 and servo motor housing 29 to allow a better appreciation of the prior art. Like references have been used for the same features as illustrated in FIG. 1. Although not shown for reasons of clarity, the addition of a rotary measurement device attached to the pivot point 13 allows the angular position of the stick control member 12 with respect to the stick housing 11 to be measured. In operation, the movement of the stick control member 12 is measured by the rotary measurement device, which provides information to an input of the servo motor 28. Depending on the desired feedback to be applied to the stick control member 12, the output drive axle 27 rotates in a manner to move the first end 25 of the second link 24 in a rotary manner about the output drive axle, as indicated by directional arrow 30. It will be appreciated that this will have the effect of either linearly pushing or pulling the first link 21, which in turn will rotate the stick control member 12 about the pivot point 13 such that the second member section 15 will move in the desired direction indicated by directional arrow 16. It will be understood from FIGS. 1 and 2, that the force generated by the servo motor 28 also acts on the stick housing 11, as indicated by load path 31, as the servo motor 28 is mechanically attached to the stick housing 11 via the servo motor housing 29.

According to one aspect of the invention, an active stick apparatus, includes a stick control member, a stick mounting, the stick control member being pivotally coupled to the stick mounting, an actuator arranged to drive the stick control member, a drive link and a mounting linkage arranged between the stick control member and the stick mounting, wherein the mounting linkage is arranged between the stick mounting and the actuator, and a position measurement device is arranged to provide positional information indicative of the position of the stick control member, the positional information being used in the determination of a required output from the actuator.

The drive link may have a first section and a second section, the mounting linkage may have a first section and a second section and the actuator may be arranged to act between the stick control member and the first section of the drive link, the second section of the drive link may be pivotally coupled to the first section of the mounting linkage and the second section of the mounting linkage may be pivotally coupled to the stick mounting. The actuator may have a housing and an output axle drive, the housing of the actuator may be fixedly coupled to the stick control member and the output axle drive of the actuator may be fixedly coupled to the first section of the drive link. Alternatively, the actuator may have a housing and an output axle drive, the output axle drive of the actuator may be fixedly coupled to the stick control member and the housing of the actuator may be fixedly coupled to the first section of the drive link.

In another alternative, the drive link may have a first section and a second section, the mounting linkage may have a first section and a second section and the actuator may be arranged to act between the second section of the drive link and the first section of the mounting linkage, the first section of the drive link may be pivotally coupled to the stick control member and the second section of the mounting linkage may be pivotally coupled to the stick mounting. The actuator may have a housing and an output axle drive, the housing of the actuator may be fixedly coupled to the second section of the drive link and the output axle drive of the actuator may be fixedly coupled to the first section of the mounting linkage. Alternatively, the actuator may have a housing and an output axle drive, the output axle drive of the actuator may be fixedly coupled to the second section of the drive link and the housing of the actuator may be fixedly coupled to the first section of the mounting linkage.

Preferably, the pivot point may be located to define a first member section and a second member section of the stick control member, one member section either side of the pivot point.

The stick mounting may provide a housing for the actuator, the first member section of the stick control member, the drive link and the mounting linkage.

The positional measurement device may be a rotary position measurement device which may be arranged between the output axle drive and the housing of the actuator. Alternatively, the positional measurement device may be a linear position measurement device which may be arranged between the housing of the actuator and the stick mounting. In a further alternative, the housing of the actuator may be pivotally mounted to a first section of a measurement drive link, a second section of the measurement drive link may be pivotally mounted to a first section of a measurement linkage and the second section of the measurement linkage may be pivotally mounted to the stick mounting and the position measurement device may be a rotary position measurement device fixedly mounted to the housing of the actuator and may be arranged to provide a measure of the pivotally movement between the housing and the measurement drive link.

A force sensor may be arranged to provide force information indicative of force applied to the stick control member, the force information being used in the determination of a required output of the actuator. A force sensor may be arranged along the mounting linkage to provide force information indicative of force applied to the stick control member, the force information may be used in the determination of a required output of the actuator. Alternatively, a force sensor may be arranged along the drive link to provide force information indicative of force applied to the stick control member, the force information may be used in the determination of a required output of the actuator. In a further alternative, a force sensor may be arranged along the stick control member to provide force information indicative of the force applied to the stick control member, the force information may be used in the determination of a required output of the actuator. In another alternative, a grip arrangement may be mounted to the second member section distal from the pivot point and a force sensor may be arranged between the grip arrangement and the second member section to provide force information indicative of force applied to the stick control member, the force information may be used in the determination of a required output of the actuator. Alternatively, a force sensor may be arranged within the actuator to provide force information indicative of force applied to the stick control member, the force information may be used in the determination of a required output of the actuator.

The stick mounting may include a gimbal apparatus arranged to provide the pivot point between the stick control member and the stick mount. The gimbal apparatus may also be arranged to allow the stick control member to move in a direction at right angles to the direction of movement provided by the pivot point and a second actuator having a housing fixedly mounted to the stick mount and an output axle drive fixedly mounted to a first section of a second drive link, a second section of the second drive link being pivotally mounted to a first section of a second mounting linkage and a second section of the second mounting linkage is pivotally mounted to the gimbal apparatus and a second position measurement device arranged to provide positional information indicative of the position of the stick control member, the positional information being used in the determination of a required output at the output axle drive of the second actuator. Alternatively, the gimbal apparatus may also be arranged to allow the stick control member to move in a direction at right angles to the direction of movement provided by the pivot point and a second actuator having a housing fixedly mounted to the stick control member and an output axle drive fixedly mounted to a first section of a second drive link, a second section of the second drive link being pivotally mounted to a first section of a second mounting linkage and a second section of the second mounting linkage is pivotally mounted to the gimbal apparatus and a second position measurement device arranged to provide positional information indicative of the position of the stick control member, the positional information being used in the determination of a required output at the output axle drive of the second actuator.

In another embodiment, the stick mounting may include a spherical joint apparatus arranged to provide the pivot point between the stick control member and the stick mount. The spherical joint apparatus may also be arranged to allow the stick control member to move in a direction at right angles to the direction of movement provided by the pivot point and a second actuator having a housing fixedly mounted to the stick mount and an output axle drive fixedly mounted to a first section of a second drive link, a second section of the second drive link being pivotally mounted to a first section of a second mounting linkage and a second section of the second mounting linkage is pivotally mounted to the stick mounting and a second position measurement device arranged to provide positional information indicative of the position of the stick control member, the positional information being used in the determination of a required output at the output axle drive of the second actuator. Alternatively, the spherical joint apparatus may also be arranged to allow the stick control member to move in a direction at right angles to the direction of movement provided by the pivot point and a second actuator having a housing fixedly mounted to the stick control member and an output axle drive fixedly mounted to a first section of a second drive link, a second section of the second drive link being pivotally mounted to a first section of a second mounting linkage and a second section of the second mounting linkage is pivotally mounted to the stick mounting and a second position measurement device arranged to provide positional information indicative of the position of the stick control member, the positional information being used in the determination of a required output at the output axle drive of the second actuator.

Preferably, the actuator may be a servo motor.

The invention will now be described, by way of example only, with reference to the accompanying drawings, in which:

FIG. 5 is a partially cross-sectioned side elevation of an alternative embodiment of an active stick apparatus accordingly to the present invention;

FIG. 6 is a schematic illustration of the embodiment of FIG. 5;

FIG. 7 is a further schematic illustration of the embodiment of FIG. 5 including a rotary measurement device;

Figure 1:
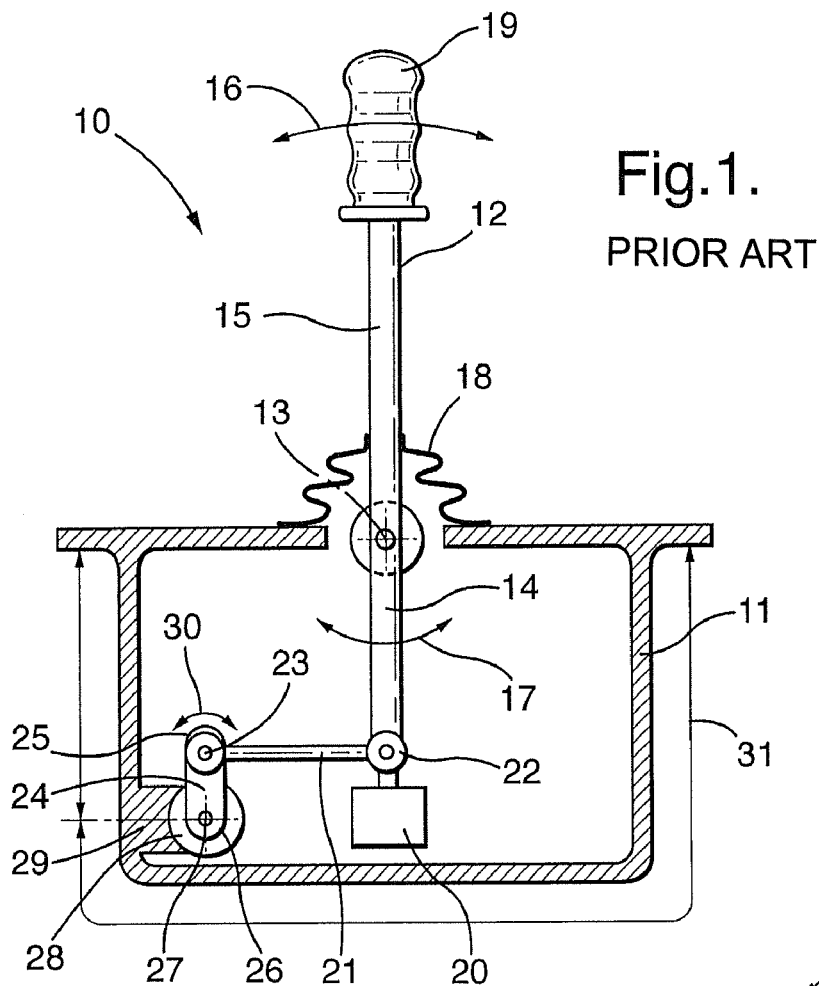
FIG. 1 is a partially cross-sectioned side elevation view of a prior art conventional mass balanced active stick apparatus.
Figure 2:
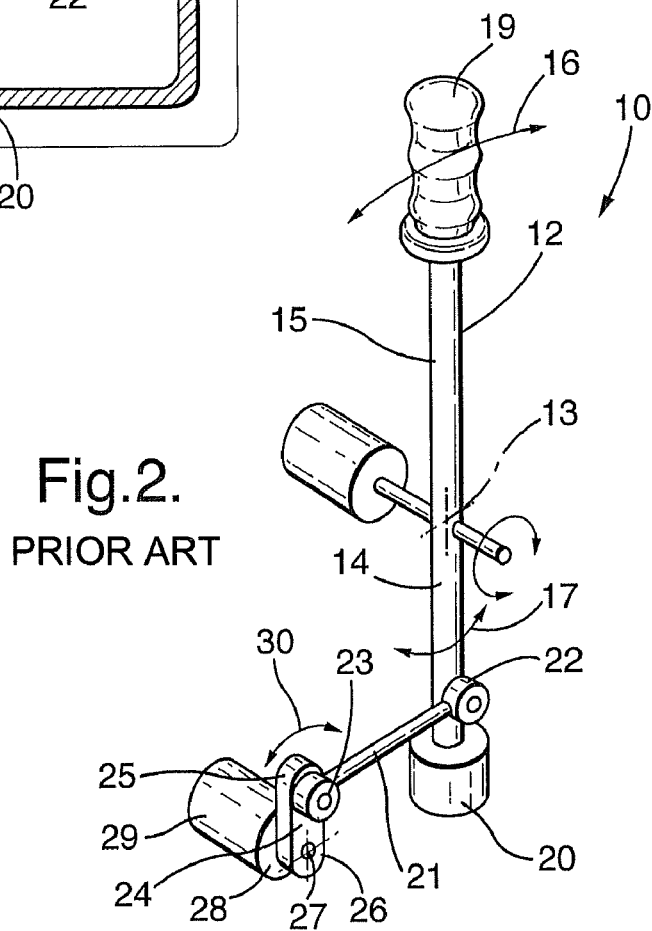
FIG. 2 is schematic illustration of the prior art conventional mass balanced active stick apparatus illustrated in FIG. 1.
Figure 3:
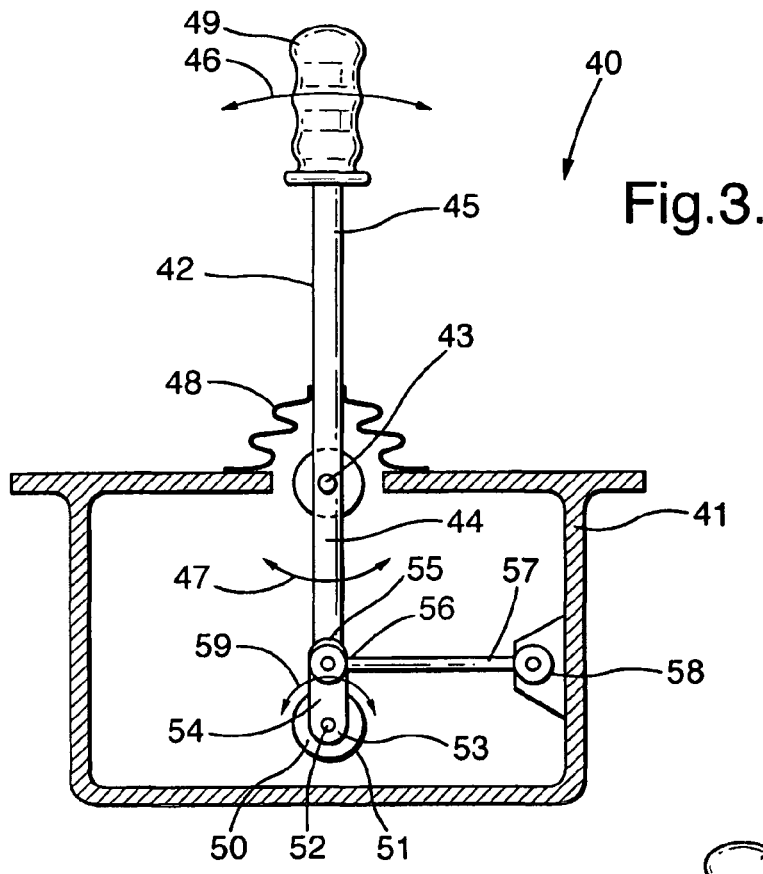
FIG. 3 is a partially cross-sectioned side elevation view of an active stick apparatus according to one aspect of the present invention.

Referring to FIG. 3, an active stick apparatus 40 according to the present invention includes a stick housing 41 and a stick control member 42, which are arranged such that the stick control member 42 is pivotally mounted to the stick housing 41 at a pivot point 43. The pivot point 43 acts to divide the stick control member 42 into a first member section 44, contained within the stick housing 41, and a second member section 45, external to the stick housing 41. It will be understood that the stick housing 41 is arranged to be fixed to a vehicle carrying the active stick apparatus 10. The pivot point 43 allows the stick control member 42 to pivot with respect to the stick housing 41, as indicated by directional arrows 46 and 47. In this particular embodiment, the directional arrows 46 and 47 indicate rotation of the stick control member 42 about a pitch axis. A gaiter 48 can be provided between the second member section 45 and the stick housing 41 to inhibit ingress of unwanted foreign material into the stick housing 41.

At one end of the second member section 45, distal from the pivot point 43, there is provided a grip arrangement 49 suitable for engagement by an operator of the active stick apparatus 40, so that a user can move the stick control member 42 in either direction shown by directional arrow 46 about the pivot point 43.

An actuator 50, for example a servo motor, is attached to the first member section 44 at an end distal from the pivot point 43. The actuator 50 is arranged to act as a counterbalance to movement of the stick control member 42 about the pivot point 43 under acceleration forces asserted on the stick control member 42 and associated grip arrangement 49 and/ or the counterbalance dynamic influence of an operator of the active stick apparatus 40. In this manner, the requirement for a lump mass as provide in conventional active stick apparatus is obviated. It will be noted that the actuator 50 can be located on the first member section 44 such that it counterbalances movement of the stick control member 42 about pivot point 43 and does not necessarily need to be located on the first member section 44 at the point furthest from pivot point 43, that is the actuator 50 can be at an intermediate position on the first member section 44 or at the end of the first member 44 distal from the pivot point 43 dependent on the application requirements.

The actuator 50 includes an actuator housing 51 and an output axle drive 52, wherein the actuator 50 is fixedly coupled to the first member section 44 by its associated actuator housing 51.

The output axle drive 52 of the actuator 50 is fixedly coupled to a first section 53 of a drive link 54 and a second section 55 of the drive link 54 is pivotally coupled to a first section 56 of a mounting linkage 57. A second section 58 of the mounting linkage 57 is pivotally coupled to the stick housing 41.

It will be appreciated that the stick housing 41 of the invention can in fact be merely a suitable stick mounting providing coupling for the stick control member 42 at pivot point 43 and coupling for the second section 58 of the mounting linkage 57 and does not have to enclose the first member section 44, drive link 54, mounting linkage 57 and/or actuator 50.

Figure 4:
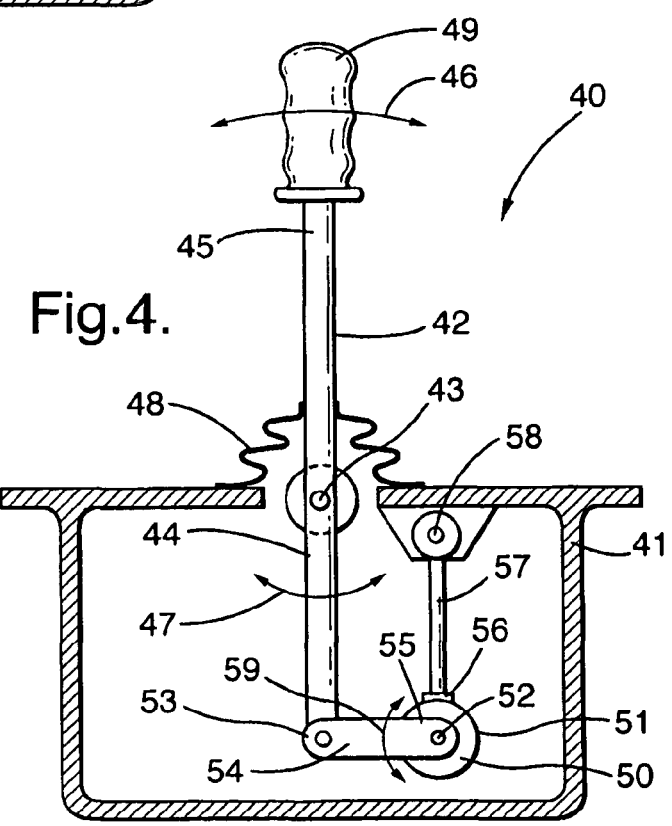
FIG. 4 is a partially cross-sectioned side elevation of an alternative embodiment of an active stick apparatus according to the present invention.

FIG. 4 illustrates an alternative embodiment of the invention wherein like references have been used to indicate similar features to those illustrated in FIG. 3. However, it will be noted that in this embodiment the output axle drive 52 of the actuator 50 is fixedly coupled to the second section 55 of the drive link 54 and the first section 53 of the drive link 54 is pivotally coupled to the first member section 44 of the stick control member 41. Furthermore, the first section 56 of the mounting linkage 57 is fixedly coupled to the actuator housing 51 of the actuator 50 and the second section 58 of the mounting linkage 57 is pivotally coupled to the stick housing 41.

FIG. 5 illustrates another embodiment of the invention, wherein like references have been used to indicate the same features as illustrated in FIG. 3. It will be noted that the coupling of the second section 58 of the mounting linkage 57 to the stick housing 41, such that mounting linkage 57 is substantially parallel with the first member section 44, allows either a more compact active stick apparatus 40 as it requires a lower sweep volume compared with the embodiment described with reference to FIG. 3 or provides a greater length of travel for a similar sweep volume compared with the embodiment described with reference to FIG. 3.

FIG. 6, is a systematic illustration of the active stick apparatus 40 as illustrated in FIG. 5, excluding the stick housing 41 and gaiter 48 to allow a better appreciation of the invention. Again, like references have been used to indicate similar features as illustrated in FIG. 4. Although not shown for reasons of clarity, the active stick apparatus 40 includes a position measurement device arranged to provide positional information indicative of the position of the stick control member 42. Hence, positional information is used to determine a required output from the output axle drive 52 of the actuator 50. In operation, movement of the stick control member 42 is measured by the position measurement device, which is used to provide information to an input of the actuator 50 which in turn provides the required output at the output axle drive 52 of the actuator 50. It will be understood, that the actuator 50 and/or further control apparatus can include suitable computation to provide a desired feedback to the stick control member 42 from positional information determined by the position measurement device.

Depending on the desired feedback to be applied to the stick control member 42, the output axle drive 52 rotates in a manner to move the first section 53 of the drive link 54 in a rotary manner about the output axle drive 52 as indicated by directional arrow 59. It will be appreciated, that the rotational movement of the drive link 54 about the output axle drive 52 will either increase or decrease the distance between the output axle drive 52 and the coupling position of the second section 58 of mounting linkage 57 to the stick housing 41. This will in turn rotate the stick control member 42 about the pivot point 43 such that the second member section 45 will move in the desired direction indicated by directional arrow 46.

For example, as can be seen in the embodiment of the invention described with reference to FIG. 3, rotation of the drive link 54 in a clockwise direction about the output axle drive 52 will increase the distance between output axle drive 52 and the mounting position for the second section 58 of the mounting linkage 57 to the stick housing 41. This has the effect of moving the stick control member 42 to the right of FIG. 3 along directional arrow 46. Alternatively, rotation of drive link 54 in an anticlockwise direction along directional arrow 59 will decrease the distance between the output axle drive 52 and mounting position for the second section 58 of mounting linkage 57 to the stick housing 41. This will have the effect of moving the active stick member 42 to the left of FIG. 3 along directional arrow 46.

In a further example, as can be see from the embodiment of the invention described with reference to FIG. 4, rotation of the drive link 54 in a clockwise direction about the output axle drive 52 will have the effect of moving the stick control member 42 to the left of FIG. 4 along directional arrow 46. Alternatively, rotation of drive link 54 in an anticlockwise direction along directional arrow 59 will have the effect of moving the active stick member 42 to the right of FIG. 4 along directional arrow 46.

Alternatively, referring to FIG. 5, rotation of the drive link 54 in a clockwise direction about output axle drive 52 decreases the distance between output axle drive 52 and the mounting position for second section 58 of mounting linkage 57 to the stick housing 41. Hence, the stick control member 42 will move to the left of FIG. 5 along directional arrow 46. Conversely, anticlockwise rotation of the drive link 54 about output axle drive 52 will increase the distance between output axle drive 52 and the mounting position for second section 58 of mounting linkage 57 to the stick housing 41. Accordingly, the stick control member 42 will move to the right of FIG. 5 along directional arrow 46.

Referring to FIG. 7, wherein like references have been used to indicate similar features as illustrated in FIG. 6, a positional measurement device, in this case a rotary position measurement device 60 is arranged to measure the angular movement between the output axle drive 52 and the actuator housing 51. In this manner, movement of the output axle drive 52 with respect to the actuator housing 51 can be transformed or calibrated to provide positional information of the stick control member 42 and can be fed to the input of the actuator 50. It will be understood, that the actuator 50 and/or further control apparatus can include suitable computation to provide a desired feedback to the stick control member 42 from positional information determined from the rotary position measurement device 60. From FIG. 7 it will be noted that the rotary position measurement device 60 is held in place with respect to the actuator housing 51 via an arm 61. Positioning the rotary position measurement device 60 on the actuator housing 51 increases the mass balance weight of the actuator 50, thereby allowing either a longer second member section 45 or a reduction in the effect of the second member section 45 rotation about the pivot point 43 under acceleration forces applied to the active stick apparatus 40.

Figure 8:
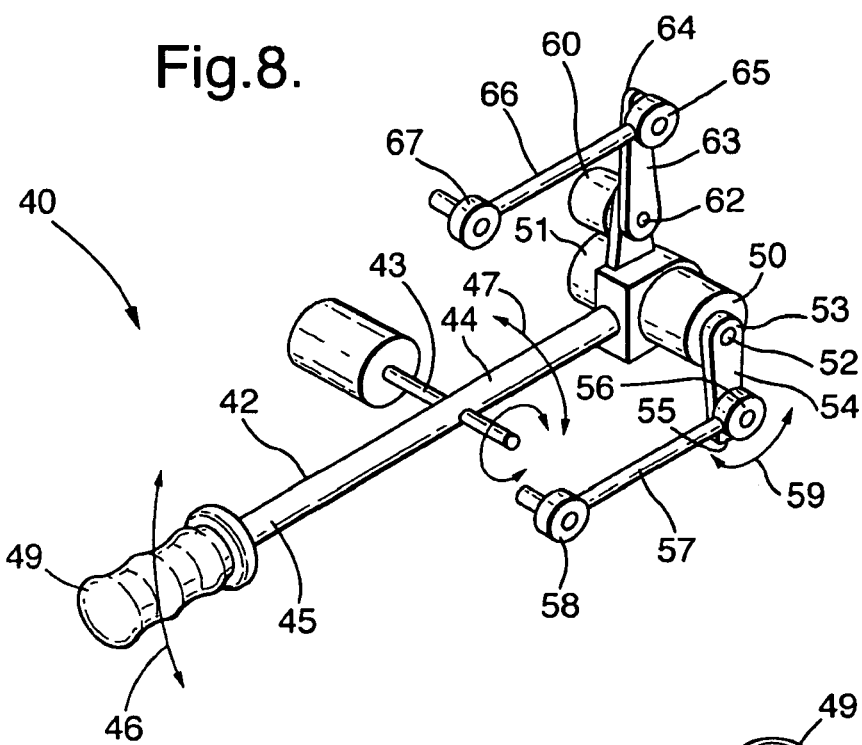
FIG. 8 is a schematic illustration of an alternative embodiment to that shown in FIG. 7, including a rotary measurement device and further linkage mechanism.

FIG. 8 illustrates an alternative arrangement for determining positional information of the stick control member 42 wherein like references have been used to indicate similar features as illustrated in FIG. 6. As can be seen, the actuator housing 51 is pivotally mounted to a first section 62 of a measurement drive link 63. A second section 64 of the measurement drive link 63 is pivotally mounted to a first section 65 of a measurement linkage 66. A second section 67 of measurement linkage 66 is pivotally mounted to the stick housing 41. A rotary position measurement device 60 is fixedly mounted to the actuator housing 51 and is arranged to provide a measure of the pivotal movement between the actuator housing 51 and measurement drive link 63. In this manner, angular movement between the actuator housing 51 and measurement drive link 63 is determined by the rotary position measurement device 60 and can be transformed or calibrated to provide positional information of the stick control member 42 that can be fed to the input of the actuator 50. It will be understood, that the actuator 50 and/or further control apparatus can include suitable computation to provide a desired feedback to the stick control member 42 from positional information determined from the rotary position measurement device 60. In this arrangement the rotary position measurement device 60 is not arranged to monitor the output axle drive 52 and may ease installation and assembly costs for the active stick apparatus 40. Again, positioning the rotary position measurement device 60 on the actuator housing 51 increases the mass balance weight of the actuator 50, thereby allowing either a longer second member section 45 or a reduction in the effect of the second member section 45 rotation about the pivot point 43 under acceleration forces applied to the active stick apparatus 40.

Figure 9:
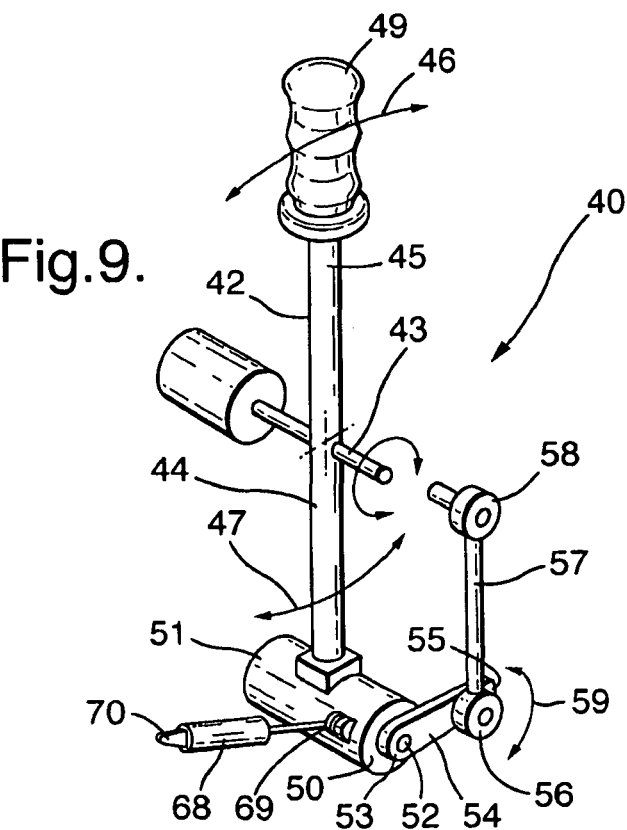
FIG. 9 is a further alternative to the embodiment illustrated in FIGS. 7 and 7, including a linear position measurement device.

Referring to FIG. 9, wherein like references have been used to indicate similar integers as illustrated in FIG. 6, a position measurement device, in this case a linear position measurement device 68, is arranged to measure the change in distance between the actuator housing 51 and the stick housing 41, not illustrated. In this manner, movement of the actuator housing 51 with respect to the stick housing 41 can be transformed or calibrated to provide positional information of the stick control member 42 as it rotates about pivot point 43. It will be understood, that the position information can be fed to the actuator 50 to provide a desired feedback to the stick control member 42. The actuator 50 and/or further control apparatus can include suitable computation to provide a desired feedback to the stick control member 42 from positional information determined from the linear position measurement device 68. From FIG. 8, it will be noted that the linear position measurement device 68 is pivotally coupled to the actuator housing 51 at first section 69 and pivotally coupled to the stick housing 41 at second section 70.

Figure 10:
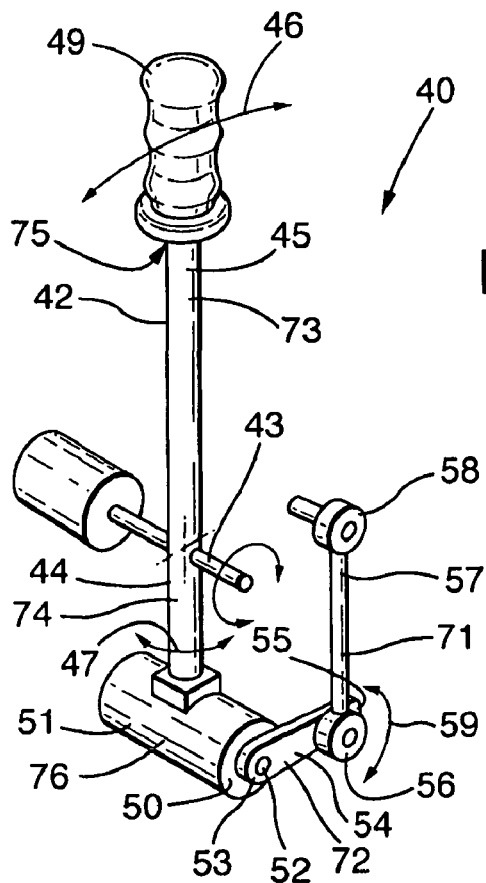
FIG. 10 is a schematic illustration of various locations for application of a force sensor to the active stick apparatus according to the present invention.

FIG. 10, wherein link references have been used to indicate similar references to those used in FIG. 6, illustrates schematically various locations for the application of a force sensor to the active stick apparatus 40, the force sensor being arranged to provide force information indicative of force applied by a user to the stick control member 42, the force information being fed to the actuator 50 to provide the required output at the output axle drive 52 of the actuator 50. It will be understood, that the actuator 50 and/or further control apparatus can include suitable computation to provide a desired feedback to the stick control member 42 from force information determined from the force sensor and that force information can be used as a secondary control to that determined from positional information.

As illustrated, the force sensor can be applied along the mounting linkage 57 at first position 71 in the form of a push-pull type force sensor to detect push-pull forces along the mounting linkage 57. Alternatively, the force sensor can be arranged along the drive link 54 at second position 72 to detect bending moment of the drive link 54.

In another alternative embodiment, the force sensor can be arranged along the stick control member 42 to provide force information indicative of bending moment of the stick control member. In this embodiment, the force sensor can be arranged along the first member section 44 at the third position 73 or along the first member section 44 at fourth position 74.

In a further embodiment, the force sensor can be arranged between the grip arrangement 49 and the second member section 45 as indicated by fifth position 75 to detect bending moment or shear force applied to the grip arrangement 49 by a user.

In a further alternative embodiment, the force sensor can be located at a sixth position 76 within the actuator 50 to detect torque at the output axle drive 52 within the actuator 50, for example built into the actuator 50 as a gear box element. As a further alternative, it can also be possible to measure current applied to the actuator 50 to determine torque at the output axle drive 52 thereby determining force applied.

The advantages of including a force sensor in the active stick apparatus 40 is that it allows a better return to centre behaviour of the stick control member 42 by mitigating the effects of friction in the actuator 50 and also allows higher gains between force and position, thus increasing stick control member 42 active stiffness.

If a force sensor is not included within the active stick apparatus 40 the device can be considered to be "force reflecting" in that a reaction force generated in response to a force that is applied by a user is proportional to the displacement of the stick control member 42 caused by the user as measured by a position measurement device.

It will be understood that more than one force sensor can be used at one or more of the first, second, third, fourth, fifth or sixth positions 71, 72, 73, 74, 75 or 76.

It will be appreciated that the embodiments of the invention as illustrated in FIGS. 3 to 10 are for a single axis active stick apparatus 40. However, the invention is equally applicable to a multiple axis system, such as that illustrated in FIGS. 10 and 11.

Figure 11:
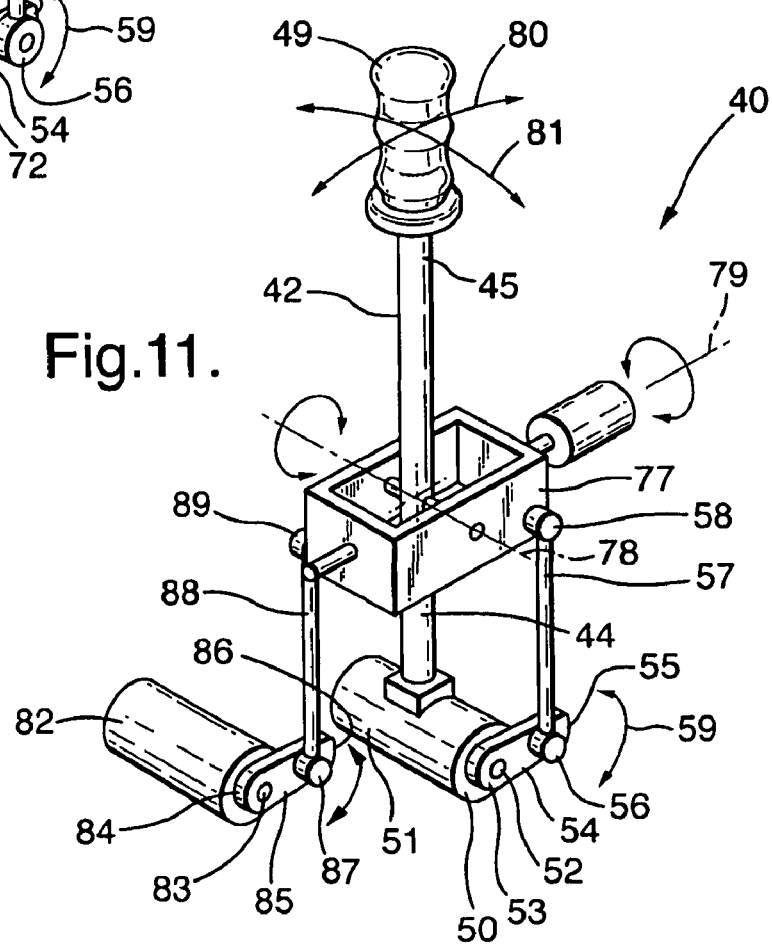
FIG. 11 is a schematic illustration of a two axis active stick apparatus according to the present invention.

Referring to FIG. 11, wherein like references have been used to indicate similar features as those illustrated in FIGS. 3 to 10, a gimbal apparatus 77 is arranged to allow the stick control member 42 to rotate about a first rotational axis 78 corresponding to pivot point 43 of previous FIGS. 3 to 10, and to rotate about a second rotational axis 79 orthogonal to the first rotational axis 78. As illustrated, the gimbal apparatus 77 is pivotally coupled to the stick housing 41, not shown, to allow the gimbal apparatus 77 to rotate about the second rotational axis 79 and the stick control member 42 is pivotally coupled to the gimbal apparatus 77 to allow the stick control member 42 to rotate about the first rotational axis 78.

It will be understood, that rotation of the stick control member 42 about first rotational axis 78 provides a pitch movement following directional arrow 80, whereas rotational movement of the stick control member 42 about the second rotational axis 79 allows a roll movement following directional arrow 81.

For the purposes of description, the gimbal arrangement 77 can be considered to replace that portion of the stick housing 41 interfacing with the stick control member 42 and mounting linkage 57, which is attached to the gimbal arrangement 77 at its second section 58. Furthermore, a roll actuator 82 having an output axle drive 83 is fixedly coupled to a first section 84 of a roll drive link 85 and a second section 86 of the roll drive link 85 is pivotally coupled to a first section of a roll mounting linkage 88. A second section 89 of the roll mounting linkage 88 is pivotally coupled to the gimbal arrangement 77 to drive movement of the gimbal arrangement 77 about the second rotational axis 79. The actuator 50 and associated drive link 54 and mounting linkage 57 are, of course, arranged to drive the stick control member about the first rotation axis 78, i.e. the pitch axis. In this embodiment, the roll actuator 82 has a roll actuator housing which is fixedly coupled to the stick housing 41, not illustrated for clarity.

Figure 12:
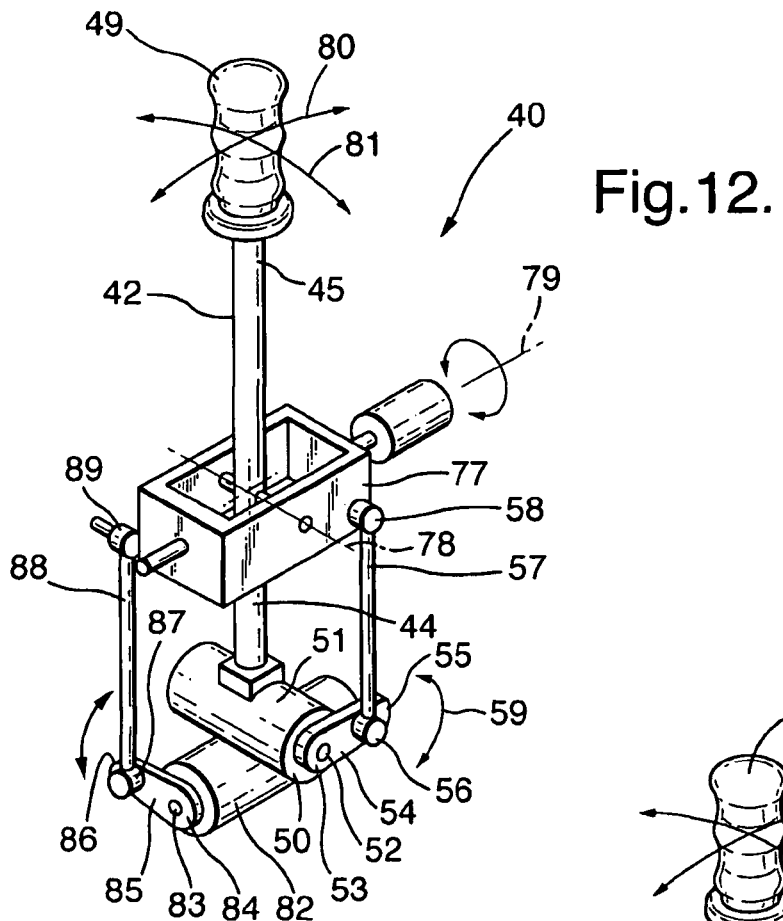
FIG. 12 is schematic illustration of an alternative embodiment two axis active stick apparatus according to the present invention.

In a further alternative, as illustrated in FIG. 12, wherein like reference have been used to indicate similar integers to those illustrated in FIG. 11, the housing of both the actuator 50 and the roll actuator 82 can be coupled to the first member section 44 of the stick control member 42 to provide additional mass to act as a counterbalance to movement of the stick control member 42 about either first rotational axis 78 or second rotational axis 79. In the embodiment of FIG. 12 it will be noted that the second section 89 of the roll mounting linkage 88 is attached to a location of the stick housing 41, not illustrated, separate from the gimbal apparatus 77.

Equally, the second section 89 can be attached to the gimbal apparatus 77 in a similar manner to that illustrated in FIG. 11, rather than to the stick housing 41. Furthermore, the embodiment of FIG. 10 can also be arranged such that the second section 89 of the roll mounting linkage 88 can be attached to the stick housing 41 at a location separate from the gimbal apparatus 77, rather than attached to the gimbal apparatus 77.

Figure 13:
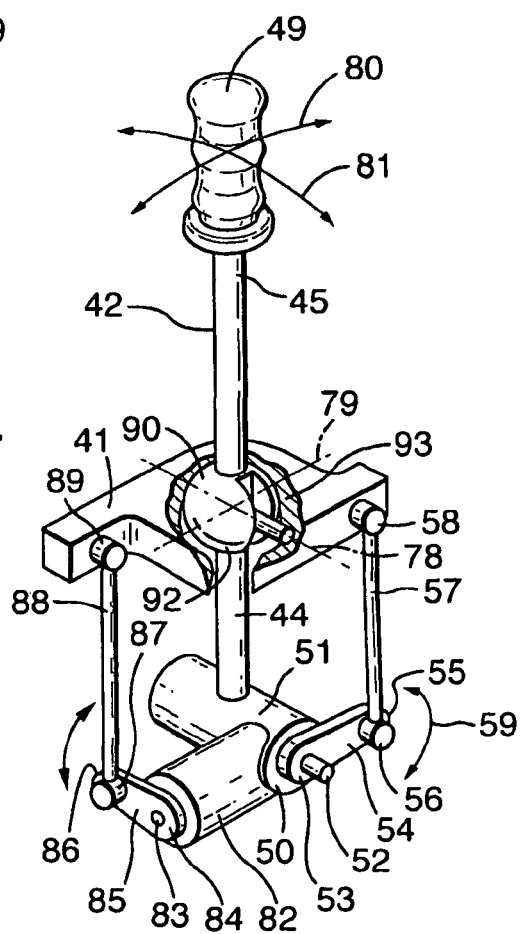
FIG. 13 is a schematic illustration, with partial cut away section, of an alternative embodiment two axis active stick apparatus according to the invention.

Referring to FIG. 13, wherein like references have been used to indicate similar features as those illustrated in FIGS. 11 and 12, a spherical joint apparatus 90 is arranged to allow the stick control member 42 to rotate about a first rotational axis 78 corresponding to pivot point 43 of previous FIGS. 3 to 10, and to rotate about a second rotational axis 79 orthogonal to the first rotational axis 78. As illustrated, the spherical joint apparatus 90 is pivotally coupled to the stick housing 41, at pivot point 91, to allow the spherical joint apparatus 90 to rotate about the first rotational axis 78 and the stick control member 42 is fixedly coupled to a ball element 92 which is arranged to rotate within a cooperating socket 93 of the spherical joint apparatus 90 to allow the stick control member 42 to rotate about the second rotational axis 79.

It will be understood, that rotation of the stick control member 42 about first rotational axis 78 provides a pitch movement following directional arrow 80, whereas rotational movement of the stick control member 42 about the second rotational axis 79 allows a roll movement following directional arrow 81.

For the purposes of description, the spherical joint arrangement 90 can be considered to replace that portion of the stick housing 41 interfacing with the stick control member 42. The mounting linkage 57 is attached to the stick housing 41 at its second section 58.

Furthermore, as illustrated roll actuator 82 can have an actuator housing fixedly coupled to the first member section 44 and an output axle drive 83 fixedly coupled to a first section 84 of a roll drive link 85. A second section 86 of the roll drive link 85 can be pivotally coupled to a first section of a roll mounting linkage 88. A second section 89 of the roll mounting linkage 88 can be pivotally coupled to the stick housing 41 to drive movement of the spherical joint arrangement 90 about the second rotational axis 79. The actuator 50 and associated drive link 54 and mounting linkage 57 are, of course, arranged to drive the stick control member about the first rotation axis 78, i.e. the pitch axis. In this manner, the mass of the roll actuator 82 acts as additional counterbalance to movement of the stick control member 42 about either first rotational axis 78 or second rotational axis 79.

In a further alternative to FIG. 13, not illustrated, the actuator 50 can be coupled to the first member section 44 of the stick control member 42 and the roll actuator housing can be fixedly coupled to the stick housing 41, similar to the arrangement described with reference to FIG. 11.

It will noted that in the embodiments of FIGS. 11 and 13, although not shown for reasons of clarity, there is an additional position measurement device, as described herein with reference to FIG. 6, 7 or 8, arranged to provide position information indicative of the position of the stick control member 42 about the second rotational axis 79. Accordingly, there are separate position sensors associate with rotation of the stick control member 42 about both the first rotational axis 78 and second rotational axis 79 and positional information provided by each position measurement device is used to determine a required output from its associated actuator 50 or

82. It will be understood, that the actuator 50 and/or the roll actuator 82 and/or further control apparatus can include suitable computation to provide a desired feedback to the stick control member 42 from positional information determined from the position measurement device.

Alternatively, a single position sensor can be arranged to determine rotation of the stick control member 42 about both the first and second rotational axis 78 and 79.

It will also be understood that one or more force sensors can be applied to one or more of the first, second, third, fourth, fifth or sixth positions 71, 72, 73, 74, 75 or 76 described and indicated with reference to FIG. 9.

The actuator can be a servo motor, magnetic solenoid, stepper motor, lead screw, hydraulic or other suitable drive means.

As those skilled in the art of active stick apparatus will appreciate, the active stick apparatus can be included in, but is not limited to, the following systems: active controllers; active inceptors; active sticks; active joysticks; active cyclic sticks; active collective sticks; active sidesticks; and active throttles.

It will also understood that the invention can be operated by the user either by hand, foot or body mass.

The invention claimed is:

1. An active stick apparatus, including:
   a stick control member;
   a stick mounting;
   the stick control member being pivotally coupled to the stick mounting at a pivot point that defines a first member section and a second member section of the stick control member either side of the pivot point;
   an actuator attached to the distal end of the first member section and arranged to drive the stick control member, the actuator being further arranged to counterbalance movement of the stick control member about the pivot point under acceleration forces asserted on the stick control member;
   a drive link and a mounting linkage arranged between the stick control member and the stick mounting, the mounting linkage being further arranged between the stick mounting and the actuator; and
   a position measurement device arranged to provide positional information indicative of the position of the stick control member, the positional information being used in the determination of a required output from the actuator.

2. An active stick apparatus, as claimed in claim 1, wherein the drive link has a first section and a second section, the mounting linkage has a first section and a second section and the actuator is arranged to act between the stick control member and the first section of the drive link, the second section of the drive link is pivotally coupled to the first section of the mounting linkage and the second section of the mounting linkage is pivotally coupled to the stick mounting.

3. An active stick apparatus, as claimed in claim 2, wherein the actuator has a housing and an output axle drive, the housing of the actuator being fixedly coupled to the stick control member and the output axle drive of the actuator is fixedly coupled to the first section of the drive link.

4. An active stick apparatus, as claimed in claim 2, wherein the actuator has a housing and an output axle drive, the output axle drive of the actuator being fixedly coupled to the stick control member and the housing of the actuator is fixedly coupled to the first section of the drive link.

5. An active stick apparatus, as claimed in claim 1, wherein the stick mounting provides a housing for the actuator, the first member section of the stick control member, the drive link and the mounting linkage.

6. An active stick apparatus, as claimed in claim 5, wherein the positional measurement device is a rotary position measurement device which is arranged between the output axle drive and the housing of the actuator.

7. An active stick apparatus, as claimed in claim 5, wherein the positional measurement device is a linear position measurement device which is arranged between the housing of the actuator and the stick mounting.

8. An active stick apparatus, as claimed in claim 5, wherein the housing of the actuator is pivotally mounted to a first section of a measurement drive link, a second section of the measurement drive link being pivotally mounted to a first section of a measurement linkage and the second section of the measurement linkage being pivotally mounted to the stick mounting and the position measurement device is a rotary position measurement device fixedly mounted to the housing of the actuator and is arranged to provide a measure of the pivotally movement between the housing and the measurement drive link.

9. An active stick apparatus, as claimed in claim 1, wherein a force sensor is arranged to provide force information indicative of force applied to the stick control member, the force information being used in the determination of a required output of the actuator.

10. An active stick apparatus, as claimed in claim 1, wherein a force sensor is arranged along the mounting linkage to provide force information indicative of force applied to the stick control member, the force information being used in the determination of a required output of the actuator.

11. An active stick apparatus, as claimed in claim 1, wherein a force sensor is arranged along the drive link to provide force information indicative of force applied to the stick control member, the force information being used in the determination of a required output of the actuator.

12. An active stick apparatus, as claimed in claim 1, wherein a force sensor is arranged along the stick control member to provide force information indicative of the force applied to the stick control member, the force information being used in the determination of a required output of the actuator.

13. An active stick apparatus, as claimed in claim 1, wherein a grip arrangement is mounted to the second member section distal from the pivot point and a force sensor is arranged between the grip arrangement and the second member section to provide force information indicative of force applied to the stick control member, the force information being used in the determination of a required output of the actuator.

14. An active stick apparatus, as claimed in claim 1, wherein a force sensor is arranged within the actuator to provide force information indicative of force applied to the stick control member, the force information being used in the determination of a required output of the actuator.

15. An active stick apparatus, as claimed in claim 1, wherein the stick mounting includes a gimbal apparatus arranged to provide the pivot point between the stick control member and the stick mount.

16. An active stick apparatus, as claimed in claim 15, wherein the gimbal apparatus is also arranged to allow the stick control member to move in a direction at right angles to the direction of movement provided by the pivot point and a second actuator having a housing fixedly mounted to the stick mount and an output axle drive fixedly mounted to a first section of a second drive link, a second section of the second drive link being pivotally mounted to a first section of a second mounting linkage and a second section of the second mounting linkage is pivotally mounted to the gimbal apparatus and a second position measurement device arranged to provide positional information indicative of the position of the stick control member, the positional information being used in the determination of a required output at the output axle drive of the second actuator.

17. An active stick apparatus, as claimed in claim 15, wherein the gimbal apparatus is also arranged to allow the stick control member to move in a direction at right angles to the direction of movement provided by the pivot point and a second actuator having a housing fixedly mounted to the stick control member and an output axle drive fixedly mounted to a first section of a second drive link, a second section of the second drive link being pivotally mounted to a first section of a second mounting linkage and a second section of the second mounting linkage is pivotally mounted to the gimbal apparatus and a second position measurement device arranged to provide positional information indicative of the position of the stick control member, the positional information being used in the determination of a required output at the output axle drive of the second actuator.

18. An active stick apparatus, as claimed in claim 1, wherein the stick mounting includes a spherical joint apparatus arranged to provide the pivot point between the stick control member and the stick mount.

19. An active stick apparatus, as claimed in claim 18, wherein the spherical joint apparatus is also arranged to allow the stick control member to move in a direction at right angles to the direction of movement provided by the pivot point and a second actuator having a housing fixedly mounted to the stick mount and an output axle drive fixedly mounted to a first section of a second drive link, a second section of the second drive link being pivotally mounted to a first section of a second mounting linkage and a second section of the second mounting linkage is pivotally mounted to the stick mounting and a second position measurement device arranged to provide positional information indicative of the position of the stick control member, the positional information being used in the determination of a required output at the output axle drive of the second actuator.

20. An active stick apparatus, as claimed in claim 18, wherein the spherical joint apparatus is also arranged to allow the stick control member to move in a direction at right angles to the direction of movement provided by the pivot point and a second actuator having a housing fixedly mounted to the stick control member and an output axle drive fixedly mounted to a first section of a second drive link, a second section of the second drive link being pivotally mounted to a first section of a second mounting linkage and a second section of the second mounting linkage is pivotally mounted to the stick mounting and a second position measurement device arranged to provide positional information indicative of the position of the stick control member, the positional information being used in the determination of a required output at the output axle drive of the second actuator.

21. An active stick apparatus, as claimed in claim 1, wherein the actuator is a servo motor.

22. An active stick apparatus, as claimed in claim 1, wherein the stick control member is for controlling a vehicle or aircraft, the acceleration forces being caused by movement of the vehicle or aircraft.

* * * * *